US008626865B1

(12) United States Patent
Phillips et al.

(10) Patent No.: US 8,626,865 B1
(45) Date of Patent: Jan. 7, 2014

(54) SHARED WORKER APPLICATION

(75) Inventors: Derek Phillips, Waterloo (CA); Andrew Grieve, Waterloo (CA); Matthew Bolohan, Kitchener (CA); Robert Kroeger, Waterloo (CA)

(73) Assignee: Google Inc., Mountain View, CA (US)

( * ) Notice: Subject to any disclaimer, the term of this patent is extended or adjusted under 35 U.S.C. 154(b) by 69 days.

(21) Appl. No.: 12/795,541

(22) Filed: Jun. 7, 2010

(51) Int. Cl.
*G06F 15/167* (2006.01)
*G06F 13/00* (2006.01)

(52) U.S. Cl.
USPC .......................................... 709/213; 711/147

(58) Field of Classification Search
USPC .......................................... 709/213; 711/147
See application file for complete search history.

(56) References Cited

U.S. PATENT DOCUMENTS

| | | | |
|---|---|---|---|
| 5,307,086 A | 4/1994 | Griffin et al. | |
| 5,864,862 A | 1/1999 | Kriens et al. | |
| 5,923,885 A | 7/1999 | Johnson et al. | |
| 6,154,756 A | 11/2000 | Hearn et al. | |
| 6,216,212 B1 | 4/2001 | Challenger et al. | |
| 6,760,756 B1 * | 7/2004 | Davis et al. | 709/215 |
| 6,996,800 B2 | 2/2006 | Lucassen et al. | |
| 7,426,713 B2 | 9/2008 | Duggan et al. | |
| 7,571,197 B2 | 8/2009 | Christensen et al. | |
| 7,979,791 B2 | 7/2011 | Yang et al. | |
| 8,122,381 B2 | 2/2012 | Vignet | |
| 2004/0119760 A1 | 6/2004 | Grossman et al. | |
| 2006/0184537 A1 * | 8/2006 | Sauve et al. | 707/10 |
| 2007/0220000 A1 * | 9/2007 | Walsh | 707/8 |
| 2009/0063262 A1 | 3/2009 | Mason | |
| 2009/0132942 A1 | 5/2009 | Santoro et al. | |
| 2009/0172589 A1 | 7/2009 | Brown et al. | |
| 2009/0287559 A1 | 11/2009 | Chen et al. | |
| 2009/0327421 A1 | 12/2009 | Fu et al. | |
| 2009/0328063 A1 | 12/2009 | Corvera et al. | |
| 2010/0077302 A1 | 3/2010 | Bostrom et al. | |
| 2010/0250653 A1 | 9/2010 | Hudgeons et al. | |
| 2010/0274910 A1 | 10/2010 | Ghanaie-Sichanie et al. | |
| 2010/0275156 A1 | 10/2010 | Hoyer et al. | |
| 2011/0082920 A1 | 4/2011 | Bhattacharya et al. | |
| 2011/0082984 A1 * | 4/2011 | Yuan | 711/147 |

(Continued)

FOREIGN PATENT DOCUMENTS

WO 2007100714 A2 9/2007

OTHER PUBLICATIONS

U.S. Appl. No. 13/250,179, by Derek Jason Phillips, filed Sep. 30, 2011.
U.S. Appl. No. 12/795,559, by Andrew Grieve, filed Jun. 7, 2010.

(Continued)

*Primary Examiner* — Jerry Dennison

(57) ABSTRACT

Techniques are described herein that provide a web application that incorporates one or more shared worker applications. In one example, a shared worker application as described herein may receive a first request for first information for a first web application, acquire the first information in response to the request, and store at least a portion of the first information in a memory of a local communications device. The shared worker may further receive a second request for second information for a second web application. The shared worker may determine whether at least a portion of the first information stored in the memory of the local communications device will satisfy the second request for the second information. The shared worker may provide, from the local memory to the second web application, at least the portion of the first information in response to the second request.

25 Claims, 11 Drawing Sheets

(56) References Cited

U.S. PATENT DOCUMENTS

| | | |
|---|---|---|
| 2011/0145565 A1 | 6/2011 | Kol et al. |
| 2011/0161990 A1 | 6/2011 | Smith et al. |
| 2011/0225509 A1 | 9/2011 | Tsao |
| 2011/0239138 A1* | 9/2011 | Galushka et al. ............ 715/760 |
| 2011/0282940 A1* | 11/2011 | Zhang et al. ................. 709/204 |
| 2012/0042286 A1* | 2/2012 | Sullivan et al. .............. 715/835 |
| 2012/0060083 A1* | 3/2012 | Yuan et al. ................... 715/234 |

OTHER PUBLICATIONS

U.S. Appl. No. 13/250,129, by Andrew Grieve, filed Sep. 30, 2011.
U.S. Appl. No. 12/855,561, by Derek Phillips, filed Aug. 12, 2010.
U.S. Appl. No. 13/250,149, by Derek Phillips, filed Sep. 30, 2011.
Office Action from U.S. Appl. No. 13/250,179, dated Dec. 7, 2011, 14 pp.
Office Action from U.S. Appl. No. 12/795,559, dated Nov. 10, 2011, 13 pp.
Office Action from U.S. Appl. No. 13/250,129, dated Nov. 23, 2011, 13 pp.
Office Action from U.S. Appl. No. 13/250,149, dated Feb. 1, 2012, 39 pp.
Response to Office Action dated Dec. 7, 2011, from U.S. Appl. No. 13/250,179, filed Mar. 7, 2012, 12 pp.
Response to Office Action dated Nov. 10, 2011, from U.S. Appl. No. 12/795,559, filed Mar. 14, 2012, 10 pp.
Response to Office Action dated Nov. 23, 2011, from U.S. Appl. No. 13/250,129, filed Feb. 23, 2012, 11 pp.
Office Action from U.S. Appl. No. 13/250,179, dated Apr. 18, 2012, 11 pp.
Response to Office Action dated Apr. 18, 2012, from U.S. Appl. No. 13/250,179, filed Jun. 18, 2012, 11 pp.
Office Action from U.S. Appl. No. 12/855,561, dated Mar. 30, 2012, 76 pp.
Response to Office Action dated Mar. 30, 2012, from U.S. Appl. No. 12/855,561, filed Jun. 27, 2012, 16 pp.
Office Action from U.S. Appl. No. 13/250,149, dated May 25, 2012, 31 pp.
Response to Office Action dated Feb. 1, 2012, from U.S. Appl. No. 13/250,149, filed May 1, 2012, 10 pp.
Mackie, "Google Calendar Gets Gmail Tasks Integration," May 13, 2009, GigaOM [online]. Retrieved from the Internet: http://gigaom.com/collaboration/google-calendar-gets-gmail-tasks-integration/, 10 pp.
Rogers, "Integrate Google Calendar and Docs into Gmail Natively," Oct. 28, 2008, ZDNet [online]. Retrieved from Internet: http://www.zdnet.com/blog/google/integrate-google-calendar-and-docs-into-gmail-natively/1166, 4 pp.
Web Workers Editors Draft Aug. 25, 2009, Ian Hickson, Google Inc., 2009 W3C, 37 pp., http://dev.w3.org/html5/workers/.
Office Action from U.S. Appl. No. 13/250,179, dated Aug. 3, 2012, 12 pp.
Response to Office Action dated Aug. 3, 2012, from U.S. Appl. No. 13/250,179, filed Nov. 2, 2012, 11 pp.
Office Action from U.S. Appl. No. 12/855,561, dated Aug. 31, 2012, 61 pp.
Response to Office Action dated Aug. 31, 2012, from U.S. Appl. No. 12/855,561, filed Oct. 31, 2012, 17 pp.

* cited by examiner

SHARED WORKER APPLICATION

TECHNICAL FIELD

This disclosure relates to network communications. More specifically, this disclosure relates to web applications configured to operate in a web browser on a communications device coupled to a network.

BACKGROUND

A web browser is an application (computer program) that operates on a computing device (e.g., a personal computer, laptop, personal digital assistant (PDA), cellphone, smartphone, or the like) to enable information available over a network (e.g., the Internet) to be accessed. A web browser may be configured to access information available over a network by utilizing uniform resource identifiers (URIs), which indicate a location by which information may be accessed. A typical web browser may be configured to present network-accessible and/or other information to a user in one or more browser windows, or browser tabs within the browser. A web browser may enable a user to open a plurality of web-browser windows, or tabs within a web browser window, simultaneously.

A web application is a software application that is accessible via a web browser as discussed above. For example, a web application may be a document, such as a hyper text markup language (HTML) document. A document web application may be configured to present information available over a network visually to a user. A document web application may present to a user one or more links (e.g., to a URI) to available information. A user may be provided an ability to select one or more links, which may result in presentation of a new web document, including information accessible via a URI associated with the link. User selection of one or more links of a web document may instead, or in addition, execute one or more non-document web applications to perform a desired function within a browser.

Many web browsers also allow non-document web applications to operate within the confines of the browser for various purposes. For example, a web application may run within the confines of a browser to facilitate communications between different document web applications running within the browser. In another example, a web application may be a digital video or music player with a representation of controls embedded within a document web application to enable a user to playback audio or video accessible via the network or local to a user's computing device. Other web applications may provide a user, via a web browser, access to email, chat, voice over Internet Protocol (VOIP) or other communications functions. Many other types of web applications may also operate within a browser. A web application may or may not be visible to a user operating the browser. In some examples, web applications are written in the Javascript language, which is a software language specifically utilized for development of web applications.

In a typical browser implementation, web applications, and information accessible via a network, may be associated with one or more domains. In order to provide security for users, many web browsers limit communications between web applications associated with different domains operating within the browser. For example, a first web application associated with the domain www.google.com may be prevented from communicating directly with a second web application associated with the domain www.espn.com. In another example, a first web application associated with the domain www.maps.google.com may be prevented from communicating directly with a second web application associated with the domain www.mail.google.com. In order to facilitate inter-domain communications, some web applications are configured to take additional steps to authenticate a web application associated with a different domain to enable inter-domain communications between the web applications.

SUMMARY

This disclosure contemplates improved techniques for the acquisition of network accessible information via a web browser application incorporating one or more shared worker applications. In one example, a computer-readable storage medium comprising instructions is described herein. The instructions cause the computing device to provide a shared worker application executed by a computing device, wherein the shared worker application is operable to share network-accessible information between a plurality of web applications also executed by the computing device. The instructions cause the shared worker application to receive a first request for first information to be provided to a first web application executed by the computing device. The instructions further cause the shared worker application to acquire from at least one server coupled to the computing device via a network, the first information in response to the first request. The instructions further cause the shared worker application to send the first information to the first web application. The instructions further cause the shared worker application to store at least a portion of the first information in a local volatile memory of the computing device. The instructions further cause the shared worker application to receive a second request for second information to be provided to a second web application executed by the computing device. The instructions further cause the shared worker application to determine that at least the portion of the first information stored in the local memory will satisfy the second request for the second information. The instructions further cause the shared worker application to send, from the volatile local memory to the second web application, at least the portion of the first information in response to the second request.

In another example, a method is described herein. The method includes providing a shared worker application executed by a computing device, wherein the shared worker application is operable to share network-accessible information between a plurality of web applications executing in the browser. Providing the shared worker application includes receiving a first request for first information to be provided to a first web application executed by the computing device. Providing the shared worker application further includes acquiring, from at least one server coupled to the computing device via a network, the first information in response to the first request. Providing the shared worker application further includes sending the first information to the first web application. Providing the shared worker application further includes storing at least a portion of the first information in a local volatile memory of the computing device. Providing the shared worker application further includes receiving a second request for second information to be provided to a second web application executed by the computing device. Providing the shared worker application further includes determining that at least the portion of the first information stored in the local memory will satisfy the second request for the second information. Providing the shared worker application further includes sending, from the volatile local memory to the second web application, at least the portion of the first information in response to the second request.

In another example, a computer system is described herein. The computer system includes a processor configured to execute computer program instructions. The computer system further includes a shared worker application executed by the processor, wherein the shared worker application is operable to share of network-accessible information between a plurality of web applications executed by the processor. The shared worker application includes means for receiving a first request for first information for a first web application executed by the processor. The shared worker application further includes means for communicating with at least one server over a network to acquire the first information in response to the first request. The shared worker application further includes means for storing, in response to the first request, the first information in a local volatile memory of the computer system. The shared worker application further includes means for providing the first information stored in the local volatile memory to a second web application executed by the processor in response to a second request for second information for the second web application.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
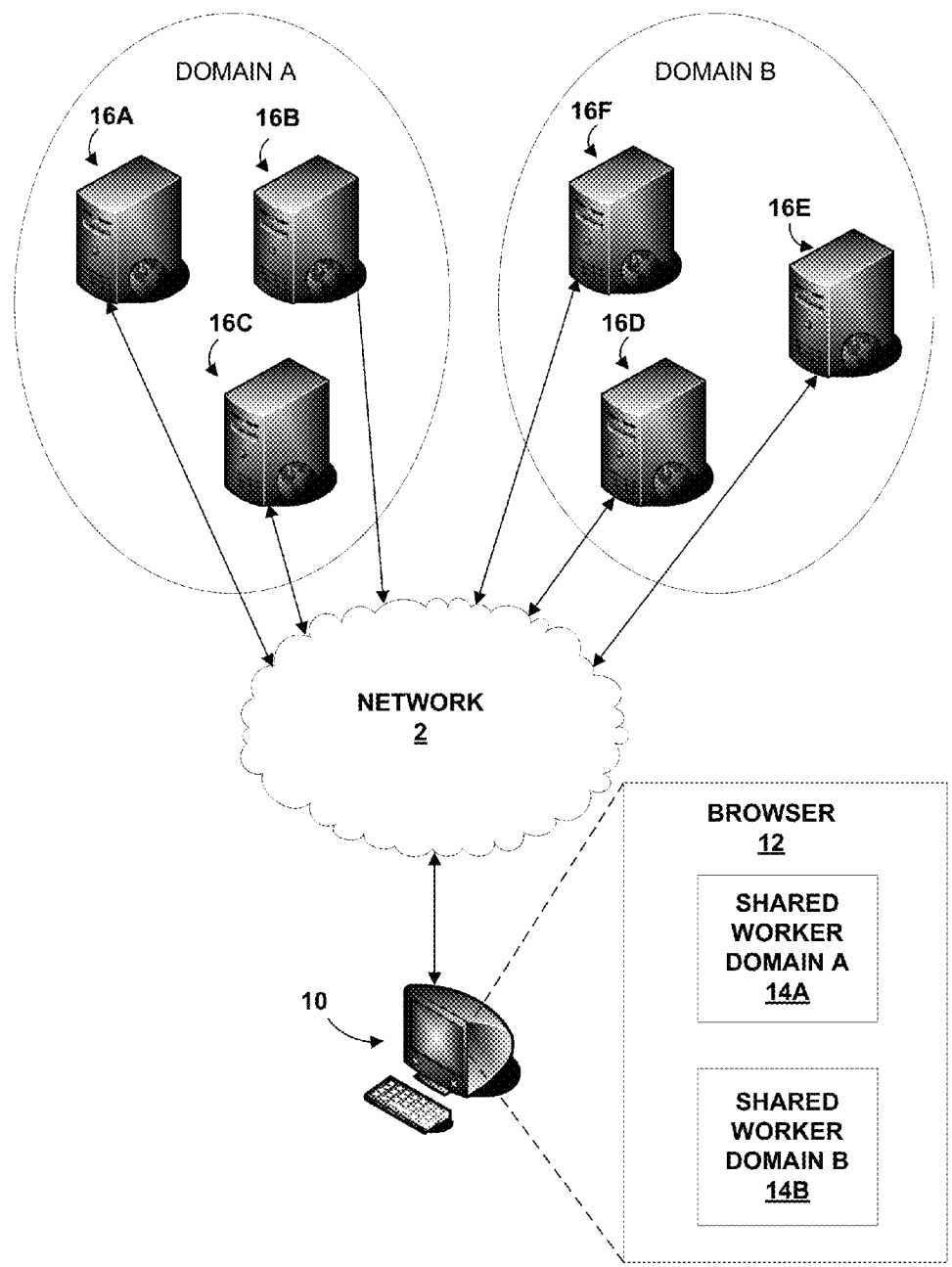
FIG. 1 is a conceptual diagram depicting one example of a computing device configured to operate a browser application consistent with techniques of this disclosure.

FIG. 1 is a conceptual diagram illustrating one example of a computing system including a browser 12 that incorporates a shared worker application consistent with this disclosure. FIG. 1 depicts a local computing device 10. Local computing device 10 may be coupled to a plurality of other computing devices via a network 2. Network 2 may be the Internet. Network 2 may instead be any other network, e.g., a public/private network or a wireless network. Computing device 10 depicted in FIG. 1 is a personal desktop computer. Although not shown in FIG. 1, computing device 10 may be any computing device configured to communicate over a network, for example a laptop computer, a cellular phone, or any other device configured to communicate information via network 2, whether the device's primary purpose is network-based communication or not. Further, computing device 10 may be coupled to network 2 by any number of known mechanisms for network communications, for example wired connections (e.g., Ethernet) or wireless connections (e.g., Wi-Fi, cellular) to network 2.

As depicted in FIG. 1, computing device 10 is coupled to a plurality of network server computing devices 16A-16E via network 2. In order to access information accessible from network servers 16A-16E, one or more browser applications (browsers) 12 may run on local computing device 10. Browser 12 may be configured to run within a local operating system of computing device 10. Non-limiting examples of known browser applications include Microsoft Explorer™, Apple Safari™, Mozilla Firefox™ and Google Chrome™ browser. Non-limiting examples of known operating systems for desktop and/or laptop computers may include Microsoft Vista™, Apple Snow Leopard™, or Linux. Examples of known operating systems for mobile devices (e.g., smartphones, netbooks, etc.) include Microsoft Windows Mobile®, Apple Iphone OS®, and Google Android™ mobile technology platform.

Browser 12 may be configured to enable a user to manipulate access to information accessible via network 2. For example, browser 12 may provide a user with an ability to enter one or more uniform resource indicators (URIs, e.g., www.google.com) in order to access a web application, such as, for example, a hypertext markup language (HTML) document. A web application, and/or information used by a web application, may be stored on one or more network servers 16A-16E. Browser 12 may be configured to access web applications and/or other information stored on network servers 16A-16E for presentation to a user of computing device 10, among other uses.

Known browsers are typically configured such that each time a web application requests access to information available via network 2, the web application must access the information from one or more network servers 16A-16E, regardless of whether another web application has already accessed the same information. To reduce redundancy, a particular web application may store accessed information (e.g., an HTML document) in a cache for use by the web application. However, known browsers are only configured to use information stored in a cache for a single web application, and a single instance of that web application (e.g., a browser window or tab displaying a particular HTML document). If another web application (or another instance of the same web application) desires to access the same information already acquired, the other web application must again access the information via one or more network servers 16A-16E.

Known browsers may further include limited capacity to share information between two web applications operating in the browser associated with the same domain via cookies. Cookies are typically stored in long term storage (e.g., hard disc storage), and are configured to only allow the sharing of limited information. A cookie is typically a text file that includes a series of name-value pairs containing small bits of information. The access of cookie information may be time/resource consuming and/or difficult, because to determine a desired cookie a web application must typically review all the cookies currently associated with the browser to access the desired information. Further, cookie information cannot be requested by a web application, and sent back to the web application in response to the request. Cookie information can only be accessed by the web browser searching through all available cookie information.

As an example of known browser access of network accessible information, if a user opens a browser window to point to the URI www.google.com, then the browser will access, via network 2, one or more network servers associated with www.google.com. The browser may acquire any information needed to display a page (e.g., HTML page) associated with www.google.com. That information may be stored in a cache, and used again if a user navigates (e.g., clicks on a link, enters a search term) within the www.google.com page. However, if a user opens a new instantiation (window or tab within browser 12) of the URI associated with www.google.com, or a different page also associated with the www.google.com domain (e.g., www.google.com/contacts), the new instantiation does not have access to the cache in which the information previously acquired was stored, and must re-access the information from the one or more network servers 16A-16E.

The re-accessing of information over a network may reduce a speed of browser/web application performance. The requirement that already accessed information be re-accessed may also limit a user's ability to perform tasks offline, for example when computing device 10 is experiencing a network outage or a slow connection. Thus, this disclosure contemplates improvements in web browser implementation techniques that allow for the sharing of previously accessed network information among a plurality of web applications and/or instantiations of web applications operating within a browser 12. More specifically, this disclosure is directed to a shared worker web application 14A, 14B that operates within a browser 12 to satisfy requests for information for one or more other web applications operating within browser 12.

FIG. 1 further depicts that network servers 16A-16C are associated with a first domain, domain A, while network servers 16D-16E are associated with a different, second domain, domain B. As discussed above, known web browser applications are typically configured to limit communication between web applications associated with different domains for security purposes. As such, as shown in FIG. 1, web browser 12 includes two shared worker applications 14A and 14B. Shared worker application 14A is configured to satisfy requests for information from one or more web applications associated with the first domain, domain A, while shared worker application 14B is configured to satisfy requests for information from one or more different web applications associated with a second domain, domain B. As will be discussed in further detail below, this disclosure is further directed to techniques for enabling cross-domain communication with a shared worker 14A, 14B. For example, according to the techniques described herein, a web application associated with domain A as shown in FIG. 1 may be able to communicate requests for information and receive responses to those requests from a shared worker 14B associated with domain B.

Figure 2:
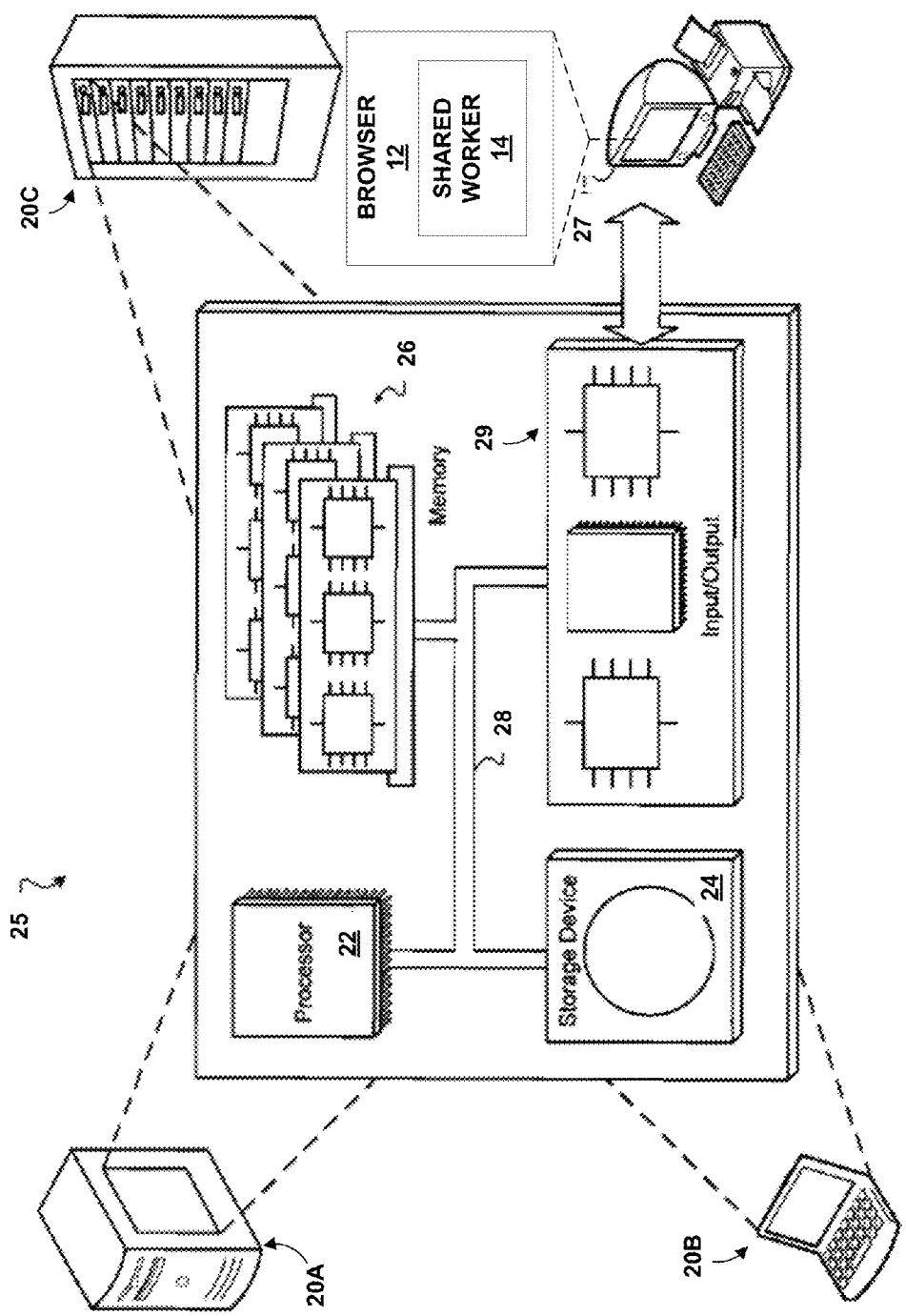
FIG. 2 is a conceptual diagram depicting one example of a computing device consistent with this disclosure.

FIG. 2 is a conceptual diagram illustrating one example of components of computing systems 25 that may used by techniques described herein. As depicted in FIG. 2, computing system 25 may be included in various types of computing devices. For example, device 20A is a desktop computer. Device 20B is a laptop computer. Device 20C is a network server or mainframe computer. Although not depicted in FIG. 2, devices incorporating computing system 25 may instead include any number of other devices configured to compute and/or communicate via a network, including mobile devices such as mobile phones, personal digital assistants, smart phones, or any other mobile device. Any of devices 20A-20C may be representative of local computing device 10 depicted in FIG. 1. Any of devices 20A-20C may also be representative of network servers 16A-16E depicted in FIG. 1.

System 25 includes a processor 22, a memory 26, a storage device 24, and an input/output component 29. Each of components 22, 24, 26, and 29 may be interconnected via a system bus 28 for inter-component communications. Processor 22 may be configured to process instructions for execution within system 25. Processor 22 may be a single threaded processor, or may instead be a multi-threaded processor configured to process various instructions in parallel simultaneously. Processor 22 may be capable of processing instructions stored in memory 26 or instructions stored on storage device 24. In one example, processor 22 may be configured to process instructions to cause a browser 12 to operate on system 25 consistent with techniques of this disclosure.

System 25 further includes peripheral devices 27. Peripheral devices 27 may include, for example, a monitor or other display device for presentation of visual information to a user of system 25. Peripheral devices 27 may further include one or more input devices to enable a user to input data to system 25, e.g., a keyboard, mouse, touchpad, trackpad, etc. Peripheral devices 27 may further include printers or other devices to output information. In one example, processor may be configured to process instructions to cause a visual depiction of a browser, e.g., browser 12 of FIG. 1, to be displayed to a user via a display of peripheral devices 27. Browser 12 may include a shared worker application 14 as described herein. Browser 12 may operate on a processor of any of devices 20A-20D depicted in FIG. 2.

Memory 26 may be configured to store information within system 600 during operation. Memory 26 may be described as a computer-readable storage medium. In some examples, memory 26 is a temporary memory, meaning that a primary purpose of memory 26 is not long-term storage. Memory 26 may also be described as a volatile memory, meaning that memory 26 does not maintain stored contents when the computer is turned off. Examples of volatile memories include random access memories (RAM), dynamic random access memories (DRAM), static random access memories (SRAM), and other forms of volatile memories known in the art.

In some examples, memory 26 may be used to store program instructions for execution by processor 22. In other examples, memory 26 may be used by software or applications running on system 25 to temporarily store information during program execution.

Storage device 24 may also be described as a computer-readable storage medium. In contrast to memory 26, storage device 24 may be configured to store larger amounts of information than memory 26. Storage device 24 may further be configured for long-term storage of information. In some examples, storage device 24 is a non-volatile memory component. In contrast with a volatile memory component, a non-volatile memory may store data whether or not power is supplied to storage device 24. Examples of non-volatile storage devices include magnetic hard discs, optical discs, floppy discs, Flash memories, and other forms of electrically programmable memories (EPROM) or electrically eraseable and programmable (EEPROM) memories.

The techniques described herein may be implemented according to a computing system 25 as described with respect to FIG. 2 in any combination of digital electronic circuitry, computer hardware, firmware, software, or any combination of digital electronic circuitry, computer hardware, firmware, software. For example, any of the techniques described herein may be implemented via executable program instructions stored in a computer-readable storage medium (e.g., storage device 24, memory 26) that are readable by processor 22 to cause processor 22 to perform the techniques of this disclosure. In other examples, some or all of the techniques of this disclosure may instead or in addition be implemented via dedicated hardware configured for a specific purpose, e.g., a field programmable gate array (FPGA), application specific integrated circuit (ASIC), digital signal processor (DSP) or like device.

Figure 3:
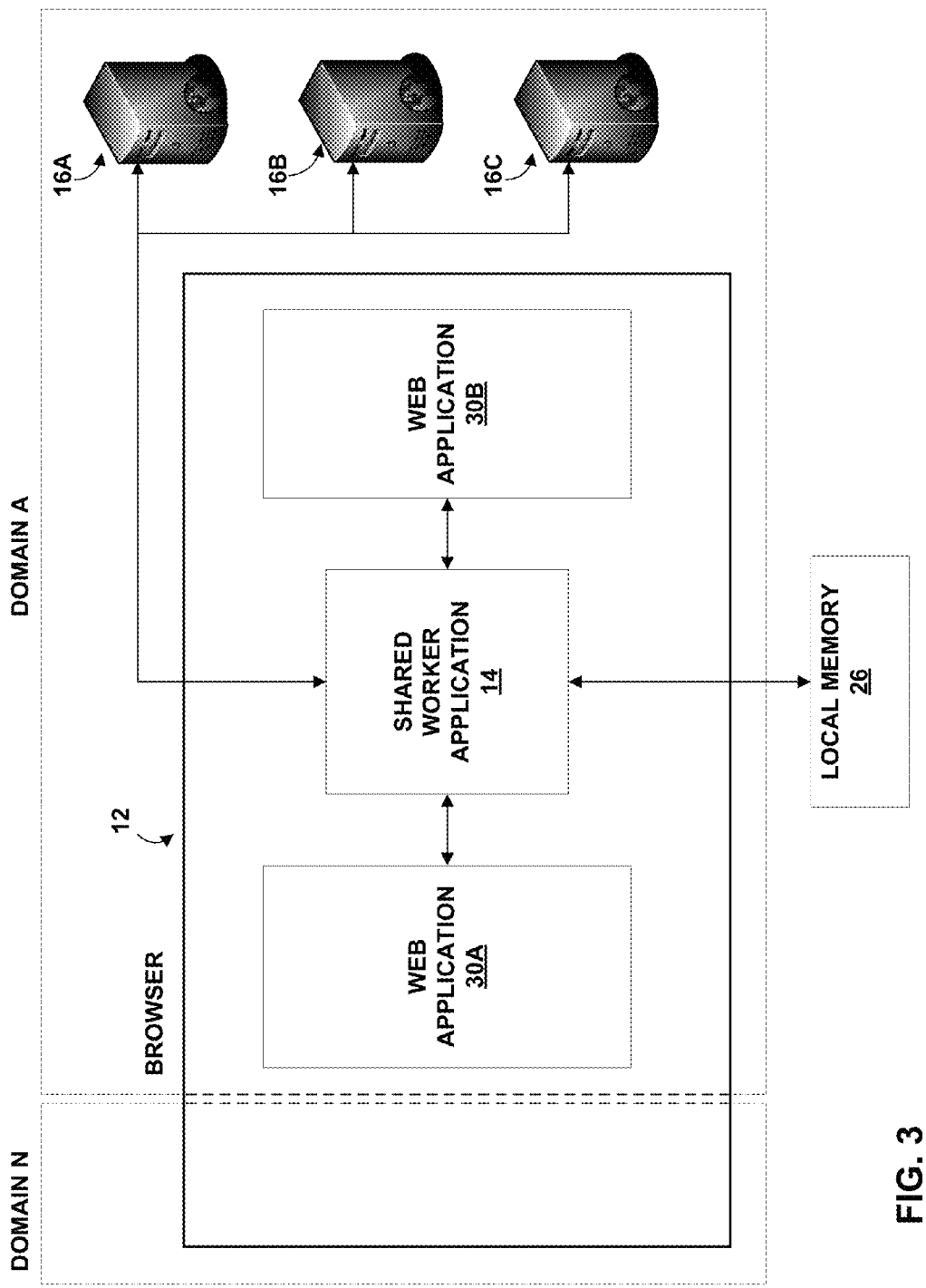
FIG. 3 is a block diagram illustrating one example of a browser application that includes a shared worker application consistent with this disclosure.

FIG. 3 is a block diagram depicting a browser 12 operating on a local computing device 10 configured to access network-accessible information. As depicted in FIG. 3, a first web application 30A, and a second web application 30B, are operating within browser 12. In some examples, web applications 30A-30B may be web documents, e.g., a HTML document as discussed above. In other examples, web applications 30A-30B may be non-document web applications that perform some sort of functionality within a browser 12. Web applications 30A-30B may or may not be visible to a user via browser 12 (e.g., one or more of web applications 30A-30B may execute without a visual indication in one or more browser 12 windows or tabs). As also depicted in the example of FIG. 3, web applications 30A-30B are both associated with a first domain, domain A. Browser 12 may also be configured for execution of other web applications operating on any number of different domains, as represented by domain N in FIG. 3.

Browser 12 further includes shared worker application 14. As discussed above, according to known browser implementations, each of web applications 30A and 30B are configured to individually communicate with one or more network servers 16A-16C to access information stored on network servers 16A-16C. For example, web application 30A may be tab or window of a browser 12 that displays a web document (e.g., an HTML page) associated with domain A. Likewise, web application 30B may be a tab or window of a browser 12 that displays a second web document also associated with domain A. Although FIG. 3 depicts web application 30A operating within the same browser 12 as web application 30B, instead of operating in separate windows or tabs of browser 12, web application 30A may execute in a first browser, while web application 30B executes in a second browser. In one example, the first browser may be first browser type (e.g., Microsoft Explorer®), while the second browser is a second browser type (e.g., Google Chrome®). In a related example, the first and second browser may be of the same type (e.g., both Google Chrome® browsers executing on the same computing device).

According to known browser implementations, to access information available on network servers 16A-16C of domain A, web application 30A must individually communicate with one or more of network servers 16A-16C, regardless of whether web application 30B has already accessed the information. Such redundant information acquisition may result in a limitation to browser 12 speed, because computing resources (e.g., processor 22, memory 26 as depicted in FIG. 2) used to re-access information cannot be used for other purposes.

Accordingly, browser 12 includes a shared worker application 14 consistent with this disclosure. Shared worker application 14 may be configured to operate as an information acquisition interface for web applications running on browser 12. Shared worker application 14 may operate intra-domain, meaning that shared worker application 14 may acquire and enable direct access to acquired information by web applications associated with the domain of shared worker application 14.

Shared worker 14 may incorporate a top-level application programming interface (API). The API may be a defined set of commands used by one or more web applications 30A-30B to interface with shared worker 14 for purposes of information acquisition and retrieval. For example, the API may define top level commands to acquire information from one or more network servers 16A-16C. In one example, where shared worker 14 is implemented using the HTML 5 specification for web communications, a top level system call may be a post message system call specifying a URI of information that a web application desires access to. The post message call may direct shared worker 14 to access information at the specified URI. The post message may also direct shared worker 14 to return acquired information to the web application. The API may also define commands directing shared worker 14 where to send acquired information. For example, web application 30A may provide shared worker 14 with a command to access information. The command, or a separate command, may direct the shared worker to supply the requested information to a different web application 30B.

Web applications 30A-30B may be configured to select among a number of options for requests to shared worker 14. In one example, Web applications 30A-30B may communicate a request for information only if the information is located in a local memory 26. According to this example, shared worker 14 may return an error message if information is not stored in local memory 26. In another example, web applications 30A-30B may be configured to communicate a request to shared worker to update all information currently stored in local memory 26. In another example, web applications 30A-30B may be configured to communicate a message indicating that shared worker 14 should access information via one or more network servers even if the information is currently stored in local memory 26.

Shared worker 14 may be configured to receive a request for network accessible information from a first web application (e.g., web application 30A). Shared worker 14 may receive the request via a top-level system call of shared worker 14. Shared worker 14 may communicate with one or more network servers 16A-16C associated with the domain of the shared worker 14 to access the requested information. If the requested information is found, shared worker 14 may return the requested information to the first web application 30A. If the requested information is not located, shared worker 14 may return an indication to the first web application 30A that the information cannot be found.

If the information is found, the shared worker 14 may also store at least a portion of the information accessed in response to the request for the first information in a local memory 26 of a local computing device 20 that browser 12 is operating on. The local memory 26 may be, as described above with respect to FIG. 2, a volatile memory of the local computing device 10. Local memory 26 may typically be used for storage of program instructions or other data used by applications or software operating on the local computing device 10.

Shared worker 14 may further maintain access to the information stored in local memory 26 in response to the request from first web application 30A. For example, shared worker 14 may maintain a pointer, e.g., one or more memory addresses, indicating a location in memory 26 where the information was stored.

Shared worker 14 may receive, from second web application 30B, another request for information. Before accessing one or more of network servers 16A-16C in an attempt to access the information, shared worker 14 may be configured to review the contents of information stored in local memory 26 to determine whether the stored information will satisfy the request from second web application 30B. If the request from second web application 30B can be satisfied based on information stored in local memory 26, shared worker 14 may provide stored information in response to the request. If the request cannot be satisfied based on information stored in local memory 26, shared worker 14 may acquire the requested information from one or more network servers 16A-16C, return the acquired information to second web application 30B, and store the acquired information in local memory 26 for later use.

Shared worker 14 may be configured as a long-running application. For example, shared worker 14 may be configured to continue operating so long as web browser 12 is operating on local computing device 20. Shared worker 14 may further be considered long-running in the sense that, although shared worker 14 is operative to access information for first web application 30A, shared worker 14 may be configured to continue running even after first web application 30A has been shut down, for example by a user closing a browser 12 window or tab in which first web application 30A was displayed to a user of browser 12. Thus, unlike a web application cache as discussed above, shared worker 14 is configured to share information spanning a plurality of web applications and/or multiple instantiations of a single web application.

Implementing a shared worker 14 in a browser 12 as depicted in FIG. 3 may be advantageous for a number of reasons. For example, shared worker 14 may improve the speed and/or efficiency of accessing network-accessible information, because particular information need only be acquired once via network 2. Such a configuration may be beneficial, because access of information via a network is typically much slower than direct access to local memory 26. Shared worker 14 as depicted in FIG. 3 may also be advantageous, because even if a web application 30A, 30B for which information was originally accessed is shut down, the information remains accessible the next time a web application desires access to at least a portion of already-acquired information. As such, a browser 12 incorporating a shared worker 14 may enable a user to perform at least some operations of web application 30A, 30B when computing device is experiencing a slow network connection or no connection at all.

Shared worker 14 may be particularly beneficial in the case of mobile web applications, because mobile networks are typically inefficient at accessing information via a network. In addition, because shared worker 14 operates as common source for acquiring network accessible information, shared worker 14 may enable the simplification of requests for information, which may further improve browser 12 speeds when web applications 30A, 30B attempt to handle error cases (e.g., retrying to access information via network 2), or when web application 30A, 30B attempt to pre-fetch data.

Figure 4:
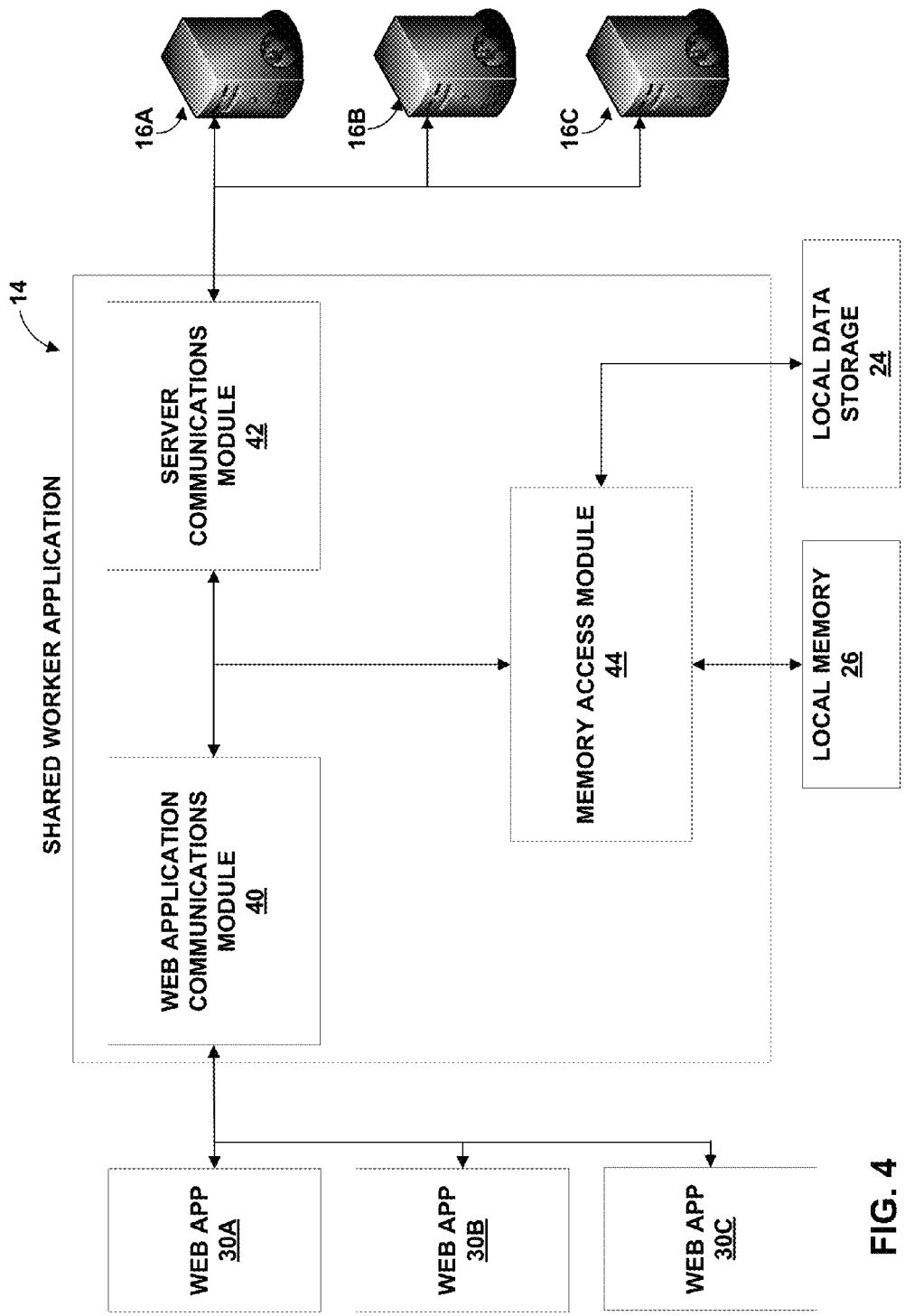
FIG. 4 is a block diagram illustrating components of a shared worker application consistent with this disclosure.

FIG. 4 is a block diagram illustrating components of a shared worker application 14 consistent with this disclosure. As depicted in FIG. 4, shared worker application 14 includes a web application communications module 40 (hereinafter "web app module 40"). Web app module 40 may be configured to communicate with one or more web applications 30A-30C operating on a browser 12 in which shared worker 14 is operating. Web app module 40 may be configured to, for example, receive requests for information from one or more web applications 30A-30C.

Shared worker application 14 further includes server communications module 42. Server communications module 42 (hereinafter "server module 42") may be configured to communicate with one or more network servers 16A-16C via a network (e.g., network 2 in FIG. 1) in order to access and/or communicate information. For example, web app module 40 may, upon receipt of a request for information from one or more of web applications 30A-30B, communicate a message to server module 42 to communicate with network servers 16A-16C to access the information. Once the information has been retrieved by server module 42, server module 42 may operate to provide the information to web app module 40. Web app module 40 may then provide the acquired information to one or more of web applications 30A-30C.

As shown in FIG. 4, shared worker application 14 may further include a memory access module 44. As described above, when server module 42 has received information from one or more network servers 16A-16C in response to a request for information, server module 42 may forward received information to memory access module 44 in addition to sending the information to web app module 40. Memory access module 44 may be configured to store the received information for potential later use. Memory access module 44 may store a pointer or other indication of stored information such that the information may be retrieved without further steps to locate the information in local memory 26.

As described above, when web app module 40 receives a request for information from one or more of web applications 30A-30C, before providing a request message for the information to server module 42, web app module 40 may send an information verification request to memory access module 44. Memory access module 44 may, in response to the request, verify whether some or all of the requested information is stored in local memory 26.

If at least some of the requested information is stored in local memory 26, memory access module 44 may return the stored information to web app module 40. If the request from one or more web applications 30A-30C may be satisfied by the information, web app module 40 may then return the stored information to one or more of web applications 30A-30C. If the request is only partially satisfied by the stored information, web app module 40 may or may not immediately return the partially satisfying information to one or more of web applications 30A-30C. In one example, web app module 40 may determine what information is not satisfied by the stored information, and communicate, to server communications module 42, a request for less information than was initially requested by the one or more of web applications 30A-30C.

Upon receipt of the requested information, if the information received from memory access module 44 was not already returned to one or more of web applications 30A-30B, web app module 40 may combine the stored information with information received in response to the request to server module 42, and return the combined information to one or more of web applications 30A-30C to satisfy the original request. Although the above description of the FIG. 4 shared worker 14 describes web app module 40 initiating communications with memory access module 44 to determine whether requested information is already stored in temporary memory, server module 42 may instead initiate such communications in response to receipt of a request for information from web app module 40.

As also depicted in FIG. 4, memory access module 44 of shared worker 14 may, in addition to local memory 26, be coupled to local data storage 24 of a computing device 10 on which browser 12 is operating. Memory access module 44 may be configured to access local data storage 24 in order to read or write data to local data storage 24. In one example, upon shutdown of browser 12 (e.g., user initiated quitting of browser application program, computing device shutdown, or the like), memory access module 44 of shared worker 14 may be configured to write information previously accessed from one or more network servers 16A-16C stored in local memory 26 to one or more locations in local data storage 24. When browser 12 is again initiated by a user or otherwise, shared worker 14 may begin running (or may be initiated by another web application), and shared worker 14 may be configured to determine where in local data storage 24 the previously acquired information is stored, and load that information into local memory 26 for use in response to requests for information from one or more web applications 30A-30C. This configuration may be beneficial, because shared worker 14 may be configured to better reduce information acquisition inefficiencies by sharing information not only across different web applications while browser 12 is operating, but by also sharing information between browser 12 sessions, such as when browser 12 is shut down entirely.

Figure 5:
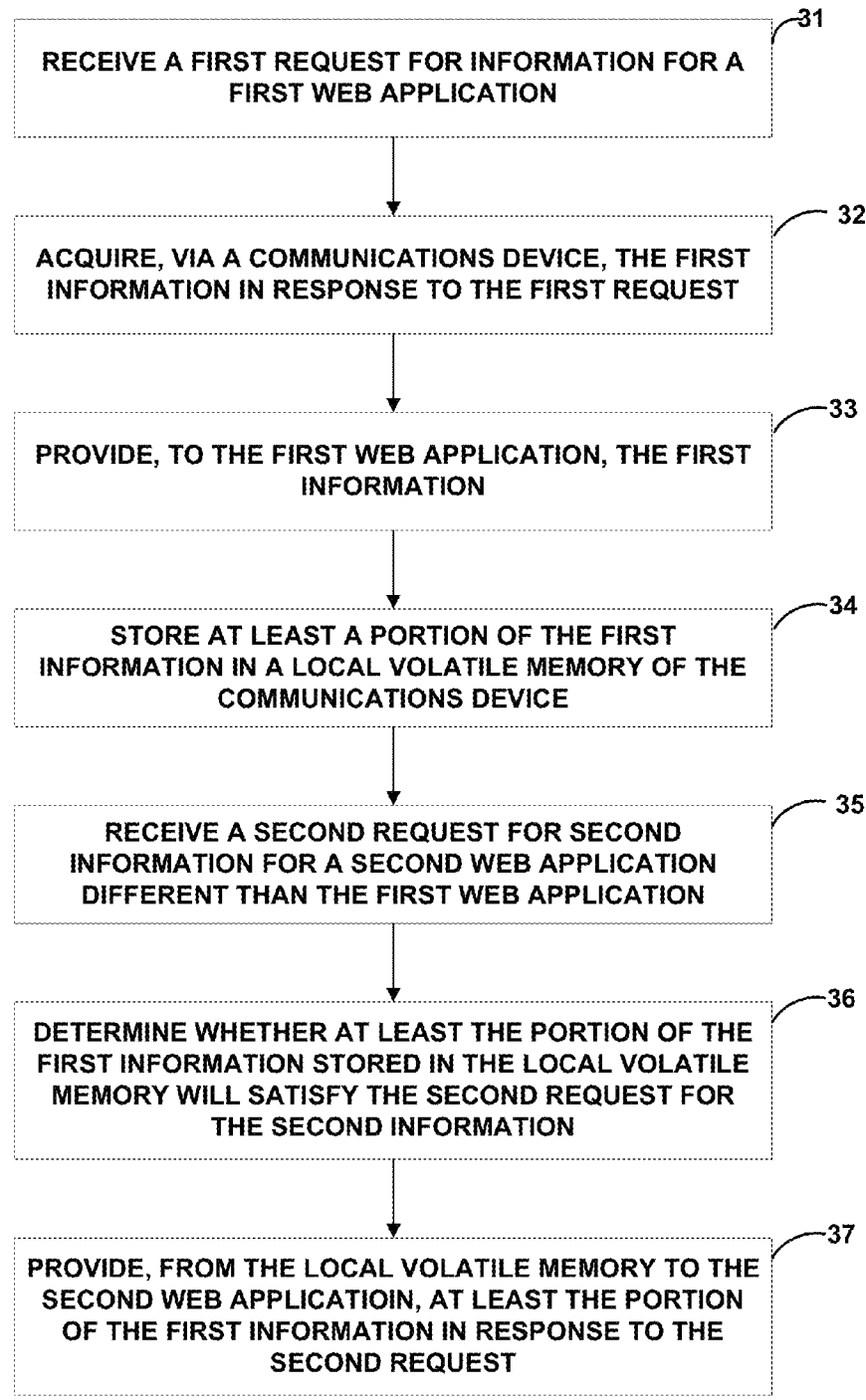
FIG. 5 is a flow chart diagram illustrating one example of a method of acquiring information consistent with this disclosure.

FIG. 5 is a flow chart illustrating one example of a method of accessing network accessible information consistent with this disclosure. The method includes receiving a request for first information for a first web application (31). The method further includes acquiring, via a communications device, the first information in response to the first request (32). The method further includes providing, to the first web application, the first information received in response to the request (33). The method further includes storing at least a portion of the first information in a local memory of the communications device (34). The method further includes receiving a second request for second information from a second web application different than the first web application (35). The method further includes determining whether the at least a portion of the first information stored in the local volatile memory will satisfy the second request for second information (36). The method further include providing, from the local volatile memory, at least the portion of the first information that satisfies at least a portion of the second request for the second information (37).

FIGS. 1-5 generally describe a shared worked 14 configured to enable sharing of network accessible information among a plurality of web applications associated with a same network domain (e.g., domain A in FIG. 3). However, it may be advantageous to enable a shared worker application 14 to communicate (including providing already accessed network information), with one or more web applications associated with a different domain than the shared worker 14 is associated. For example, it may be beneficial to reduce or eliminate duplicate acquisition of information accessed by web applications associated with different domains that are provided by the same provider or otherwise associated providers of the different domains.

Figure 6:
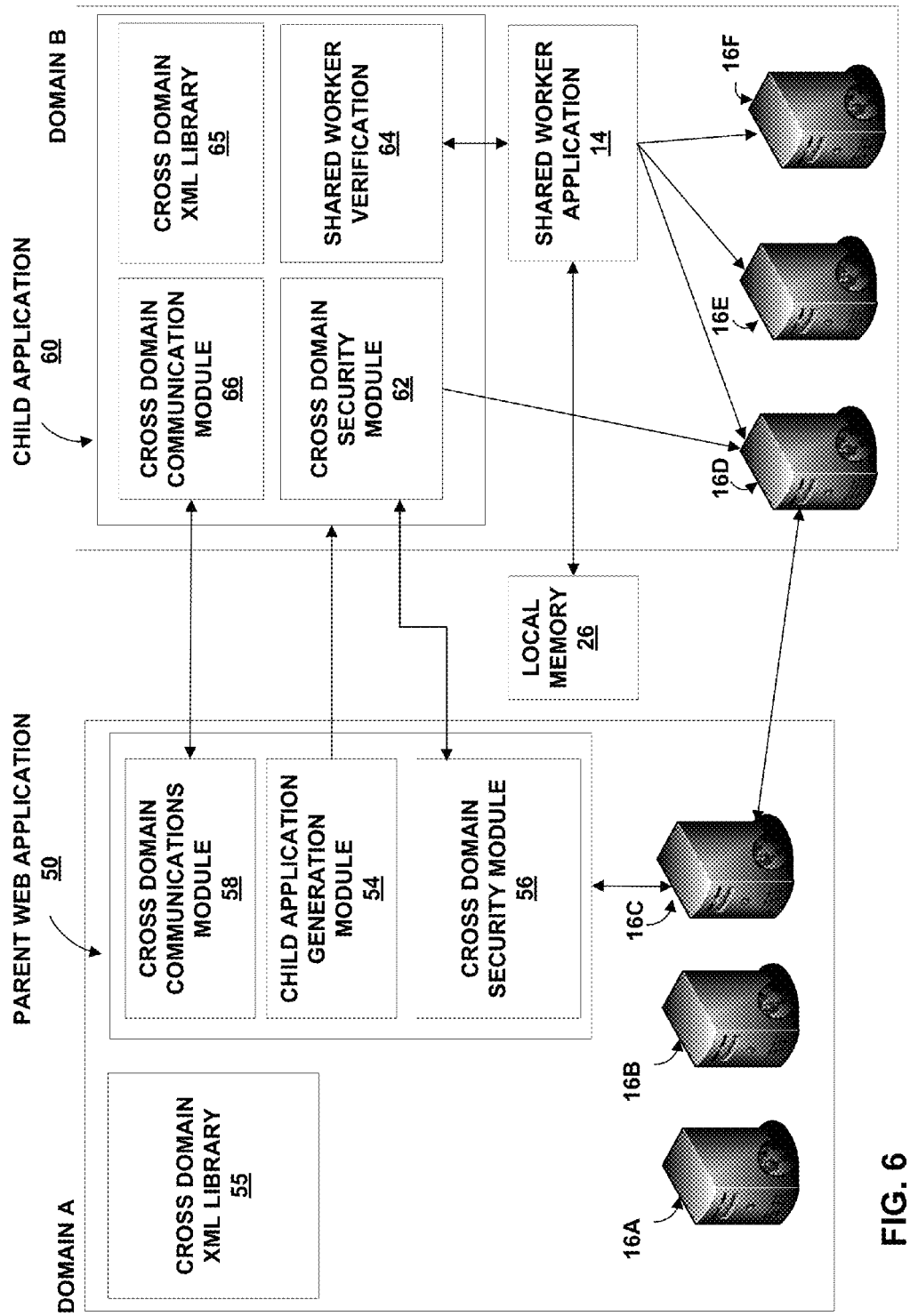
FIG. 6 is a block diagram illustrating one example of cross-domain communications with a shared worker application consistent with this disclosure.

FIG. 6 is a block diagram illustrating one example of cross-domain communications with a shared worker 14 consistent with this disclosure. As shown in FIG. 6, a first web application, parent web application 50, may be operating within a browser (e.g., browser 12) on a user's local computing device. Parent web application 50 may be associated with a first domain, domain A. Parent web application 50 may desire to communicate with one or more web applications associated with a second domain, domain B. A domain as discussed herein may be described as the portion of a URI before the first forward slash (e.g., for the URI www.google.com/contacts, the domain is www.google.com). In particular, parent web application 50 associated with a first domain, domain A, may desire to communicate with one or more shared worker applications 14 associated with a second domain, domain B.

As depicted in FIG. 6, parent web application 50 may include a child application generation module 54. Child application generation module 54 may be configured to initiate communications with a shared worker application 14 associated with domain B. Child application generation module 54 may be configured to create a child web application, e.g., child application 60 in the example of FIG. 6. In some examples, child web application 60 may be an inline frame (iframe) application as is well known in the art. In other examples, child web application 60 may be a frame application or an xframe application as are also well known in the art. Other examples of child web applications 60 are also contemplated and consistent with this disclosure. Child web application 60 may or may not be visible to a user via browser 12.

As shown in FIG. 6, parent web application 50 may cause a generated child web application 60 to be associated with a second domain different than a domain parent web application is associated with. In one example, child application generation module 54 of parent web application may generate child web application 60 associated with domain A, and execute commands within browser 12 to cause child web application 60 to be associated with the second domain, domain B. Instead, parent web application 50 may directly generate child web application 60 associated with domain B.

Once child web application 60 has been generated and associated with domain B, child web application 60 may be operable to communicate with one or more web applications operating in browser 12. However, due to security requirements of browser 12, child web application 60 may be prevented from communicating information associated with domain B to parent web application 50 associated with domain A.

Child web application 60 may include a shared worker verification module 64. Shared worker verification module 64 may be operable to, upon generation of child web application 60, attempt to verify a shared worker 14 of domain B. For example, shared worker verification module 64 may attempt to determine whether or not a shared worker 14 is currently operating in browser 12 associated with domain B. If shared worker 14 is currently operating associated with domain B, shared worker 14 may establish a communications link with shared worker 14 and remain active for further communications. If a shared worker 14 is not currently operating associated with domain B, shared worker verification module 64 may be configured to instantiate, or generate, a shared worker 14 associated with domain B. In one example, child web application 60 may generate a shared worker based on execution of one or more programs of browser 12 in order to generate shared worker 14. In one non-limiting example according to the HTML5 specification, a shared worker 14 may be instantiated by execution of a var worker=new SharedWorker(URI); system call.

As depicted in FIG. 6, in one example, parent web application 50 may have access to a cross-domain XML library 55 associated with domain A. As also shown in FIG. 6, child web application 60 may have access to a cross-domain XML library 65 associated with domain B. In various examples, techniques of this disclosure related to cross-domain communication as described herein may be implemented via operations defined by cross-domain XML libraries 55 and 65. For example, either of cross-domain XML libraries 55 and 65 may include executable program instructions that may be executed by a processor 22 of a local computing device 10 in order to, for example, generate child web application 60 and/or verify a shared worker 14 operating associated with domain B as described above.

Once a shared worker 14, and/or a communications link to shared worker 14, has been established by shared worker verification module 64, as mentioned above, due to browser security restrictions, parent web application 50 may be prevented from communicating with web applications associated with domain B, including shared worker application 14, e.g., to send shared worker 14 a request to access information from one or more network servers 16D-16F associated with domain B. However, web browser 12 may be configured to allow specific types of cross-domain communications in this configuration. For example, communications between parent web application 50 and child web application 60 to establish secure cross-domain communications may be allowed. In one example, child web application 50 may be configured to ignore all messages from parent web application 50 not related to secure authentication of parent web application 50 until parent web application 50 has been authenticated.

Parent web application 50 includes cross-domain security module 56. Cross-domain security module 56 (security module 56) may be configured to communicate with an associated cross-domain security module 62 (security module 62) of child web application 60 to securely authenticate communications between parent web application 50 (domain A) and web applications associated with domain B, including shared worker application 14. In various examples discussed below, security module 62 may be configured to receive information from security module 56, and communicate that information to one or more network servers 16D-16F, to determine whether or not parent web application 50 should be allowed to securely communicate with one or more web applications (e.g., shared worker application 14) associated with domain B.

In one example, security module 56 may be configured to communicate, to security module 66, one or more identifications of parent web application 50 and/or domain A. Security module 56 may communicate the received one or more identifications to a network server associated with domain B, e.g., one or more of network servers 16D-16F (network server 16D in the example of FIG. 6). In some examples, network server 16D-16F may be a network server associated with domain B that is dedicated to authentication of secure communication requests. One or more of network servers 16D-16F may include a list of domains and/or web applications for which secure communications should be authorized (e.g., a whitelist). According to this example, network server 16D-16F may be configured to compare the one or more identifications received from security module 62 to the list of authorized domains and/or web applications. If the one or more identifications are included in the list, network server 16D may return an indication of authentication to security module 62.

In another example, security module 56 may itself include a list of a list of domains and/or web applications for which secure communications should be authorized (whitelist). According to this example, security module 56 may receive the one or more identifications of domain A and/or parent web application 50, and security module itself may perform a comparison to determine whether or not to enable cross-domain communications with parent web application 50.

In one example, the indication of authentication may indicate that any web application associated with domain A should be allowed to securely communicate with any web application associated with domain B. In other examples, the indication of authentication indicates that parent web application 50 should be allowed to securely communicate with any web application associated with domain B. In still another example, the indication of authentication indicates that parent web application 50, or any web application associated with domain A, should be allowed to securely communicate specifically with shared worker 14 associated with domain B.

In an example, instead of authenticating cross-domain communications as described above, secure cross-domain communications may be established based on security tokens. According to this example, security module 56 of parent web application 50 may be configured to request, from one or more network servers 16A-16C associated with domain A, a security token for communicating with domain B. The one or more network servers 16A-16C associated with domain A may then communicate with one or more network servers 16D-16F associated with domain B to acquire the requested security token. One or more of network servers 16D-16F may then return to one or more network servers 16A-16C a secure token, which is then sent to parent web application 60. Parent web application 60, via cross domain security module 56, send the received token to cross domain security module 62. Cross domain security module 62 may then communicate the received token to the one or more network servers 16D-16F associated with domain A, and network servers 16D-16F may determine whether the token is the same as the one it generated and sent to parent web application 50 via one or more network servers 16A-16C as described above. If the security token matches the one that was originally sent, the one or more network servers 16D-16F may return an indication of authentication that cross-domain communications should be authorized. This indication may be returned to one or more of security modules 62 and 56, and may be used by security modules 62 and 56 to enable communications between parent web application 50 and child web application 60. In one example, the indication of authentication may indicate that any web application associated with domain A should be allowed to securely communicate with any web application associated with domain B. In other examples, the indication of authentication indicates that parent web application 50 should be allowed to securely communicate with any web application associated with domain B. In still another example, the indication of authentication indicates that parent web application, or any web application associated with domain A, should be allowed to securely communicate specifically with shared worker 14 associated with domain B.

In one example, parent web application 50 may include the security token as a query parameter for the uniform resource locator (URL) of the child web application. Communications may only be allowed between child web application 60 and parent web application 50 while the token is valid.

If security module 62 receives an indication of authentication (according to either authentication method described above) that parent web application 50 should be allowed to securely communicate with web applications associated with domain B, parent web application 50 and child web application 60 may establish respective cross-domain communications modules 58 and 66. Cross-domain communications modules 58 and 66 may be configured to establish a communications link between parent web application and child web application to exchange information.

In one example, a communications link between communication modules 58 and 66 may remain established while browser 12 is operating. In other examples, the communications link may only remain established while at least one web application associated with domain A, and/or at least one web application associated with domain B, is operating in browser 12.

Once a communications link between parent web application 50 and shared worker 12 has been established as discussed above, parent web application 50 associated with domain A may freely communicate with shared worker 14 associated with domain B via child application 60. For example, parent web application 50 may communicate requests for information from network servers of domain B, which are received by communications module 66 of child web application 60, and passed to shared worker 14. Shared worker 14 may then acquire information from one or more network servers 16D-16F associated with domain B in response to the request, store acquired information in local memory 24, and return the acquired information to parent web application 50 via child web application 60.

In another example, parent web application 50 may request information from one or more network locations associated with domain A, acquire the information, and communicate acquired information to shared worker application 14 via child web application 60. Shared worker application 14 may be configured to store the received information from domain A, and provide the stored information to one or more web applications associated with either of domain A or domain B upon receiving a request for the information. If web applications in addition to parent web application 50 operating in browser 12 associated with domain A are also configured to securely communicate with shared worker 14, shared worker application 14 may provide stored information originally received from domain A, and provide that information to other web applications associated with domain A.

The examples of cross-domain shared worker communication described above with respect to FIG. 6 may be advantageous for a number of reasons. For example, by enabling web applications associated with domains other than a domain associated with a particular shared worker application 14 to communicate with the shared worker application 14, redundant data retrieval may be even further reduced or eliminated. As such, browser 12 efficiency to access network-accessible information may be improved.

The example depicted in FIG. 6 shows cross-domain communications between a primary web application 50 associated with a first domain (domain A) and a shared worker 14 associated with a second domain, domain B. In other examples not depicted in FIG. 6, shared worker 14 may be operable to enable cross-domain communication between the primary web application 50 associated with domain A, and a second primary web application (not shown) associated with the domain that shared worker 14 is associated with (e.g., domain B). According to these examples, shared worker 14 may be operable to, via child web application 60, enable cross-domain communication between primary web applications associated with different domains. In one such example, a primary web application 50 may be a calendaring web application (e.g., www.google.com/calendar) associated with domain A. The calendaring web application may receive from a user an indication to send a calendar invitation email. An email web application (e.g., www.gmail.com) associated with a different domain (e.g., domain B) may, via shared worker 14 associated with domain B, through child web application 60, receive at least one indication of the calendar invitation email. Accordingly, the primary web applications (calendaring, domain A; email, domain B) may communicate status updates (e.g., a calendar invitation email) local to the device upon which 12 is operating, without accessing network 2 to convey status updates.

Figure 7:
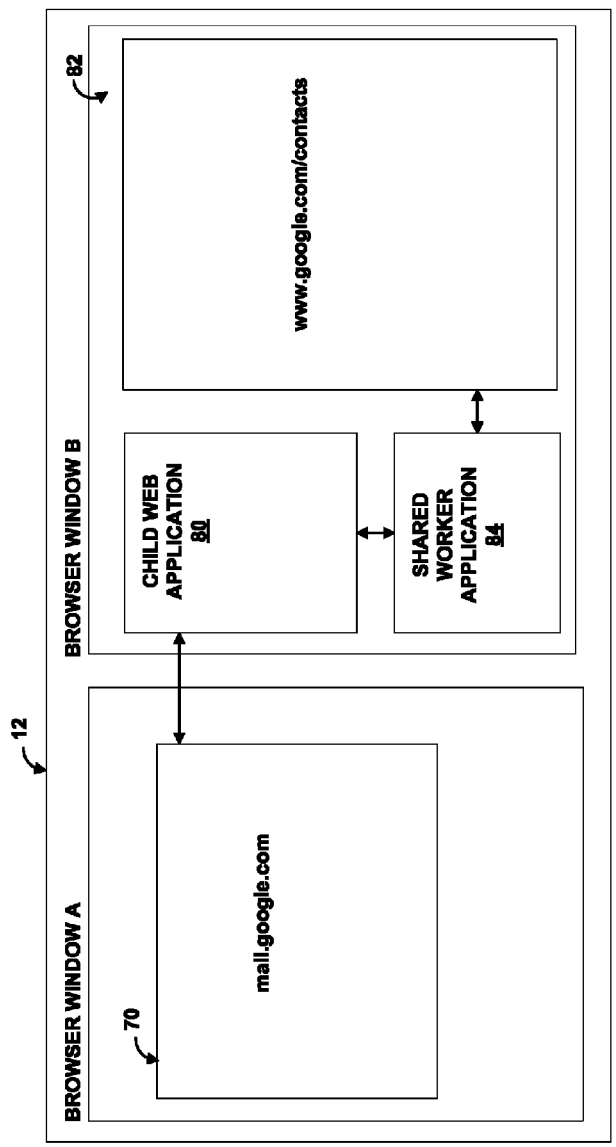
FIG. 7 is a conceptual diagram illustrating one example of a use case using techniques consistent with this disclosure.

FIG. 7 illustrates one working example of cross-domain shared worker communications. According to this example, a user operates a browser 12 on a local computing device 10 as described above with respect to FIG. 1. In a first window (or tab) of browser 12, browser window A, a first web application 70 is operating associated with the domain mail.google.com (e.g., an HTML page associated with mail.google.com). Web application 70 may be, for example, configured as an email, instant messaging, voice messaging, video messaging, social network, or other web-based communication platform. A user may be required to enter a username and/or a password to acquire access to the first web application 70 associated with mail.google.com. Information associated with first web application 70 may be stored on one or more network servers associated with the mail.google.com domain.

In a second window (or tab) of browser 12, browser window 2, the user operates a second web application 82 (e.g., an HTML page with the URI www.google.com/contacts) associated with the domain www.google.com. Second web application 82 may be configured to present a user with a list of the user's contacts, which are stored on a network server associated with the www.google.com/contacts domain. The user's contacts may include email, instant messaging, telephone numbers, social networking identifiers, or any other form of contacts for associates of a user. Second web application 82 may enable a user to, for example, add a new contact name and contact addresses to a user's contact data stored on one or more network servers associated with the www.google.com domain. For purposes of this example, assume a user has used second web application 82 to enter an email address for a contact named John Smith. Once the user has created the new contact via second web application 82, the new contact information may be provided to one or more network servers associated with www.google.com and stored for later use.

First, web application 70 may desire information available at one or more network servers associated with the www.google.com/contacts domain. For example, a user may desire to send an email to an associate for whom an email address is stored on one or more network servers associated with www.google.com. For purposes of this example, assume that a user desires to send an email to the contact named John Smith. Since the user just entered the contact named John Smith using the second web application 82 associated with www.google.com, first web application 70 does not currently have direct access to the updated information. A user may initiate the updating of information associated with www.google.com by selecting a button visually presented to a user via first web application 70 titled "update contacts list," for example.

According to traditional browser implementations, in order to acquire the information associated with the contact John Smith, first web application 70 would be required to send a request for the information to one or more network servers associated with the domain mail.google.com. In response to the request, the one or more network servers associated with the domain mail.google.com may communicate with one or more network servers associated with the domain www.google.com, gain secure access, request the information, receive the information, and return the information to the first web application 70. Thus, according to traditional browser implementations, the first web application 70 must access, via the network, information already accessed (due to the previous operating of the second web application 82 by the user). This approach may be inefficient, as it results in network access of identical information (a user's www.google.com/contacts contact list) repetitively.

However, network information access may be improved according to techniques of this disclosure implementing a browser 12 configured to run one or more shared worker applications 14. According to such techniques, when the user first accessed www.google.com/contacts, instead of second web application 82 directly accessing information associated with www.google.com from one or more network servers associated with www.google.com, the second web application 82 instead may send a request to shared worker 84. Shared worker 84 may acquire the requested information from the one or more servers associated with www.google.com, and store the information in a local memory of the user's computing device operating browser 12. Accordingly, this information is now available for later use by other web applications associated with www.google.com (e.g. a third browser window viewing the www.google.com HTML document), or by other web applications not associated with www.google.com (e.g., first web application 70 associated with mail.google.com) via the shared worker.

As discussed above, first web application 70 may desire to access information available via one or more network servers associated with domain www.google.com (e.g., to update a contacts list for mail.google.com such that the user may email the contact named John Smith). According to techniques of this disclosure, first web application 70 may cause a child web application to be generated and associated with the domain www.google.com/contacts. The child web application 80 may then attempt to verify whether a shared worker 84 is operating in browser 12 associated with the domain www.google.com/contacts. If it is (which is the case here, because as discussed above the user visited www.google.com/contacts to update the user's contacts list), then the child web application 80 may create a communications link with the shared worker 84. If a shared worker 84 is not operating in browser 12 associated with the domain www.google.com, child web application 80 may generate or instantiate shared worker 84 associated with the domain www.google.com.

The child web application 80 may then attempt to authenticate first web application 70 for secure communications. For example, child web application 80 may communicate an identification of first web application 70 to one or more network servers associated with www.google.com/contacts for comparison to a list ("white list") of previously determined domains and/or web application with which secure communications are allowed for web applications associated with www.google.com/contacts. In another example, child web application 80 may authenticate secure communications via secure token exchange as described above with respect to FIG. 6.

Once secure communications have been established between first web application 70 and the domain www.google.com/contacts, first web application 70 may, via child web application 80, request information associated with www.google.com from shared worker 84 associated with www.google.com. If shared worker 84 has previously stored information that would satisfy the request, shared worker 84 may return the requested information to first web application 70 via child web application 80 (which is the case here, as a user recently visited www.google.com, and via shared worker 84 the information was acquired and stored in a local memory of the user's computing device). If, however, shared worker 84 has not already previously stored information that would satisfy the request, shared worker 84 may access the information from one or more network servers associated with www.google.com, return that information to first web application 70, and store the acquired information in local memory for later use in response to requests for information associated with the domain www.google.com.

Thus, according to the techniques of this disclosure, information already accessed from one or more network locations in response to a request from one or more web applications may be re-used by one or more other web applications. Browser speed may be improved based on the techniques described herein, because the need for redundant network access to acquire information may be reduced or eliminated.

Although the examples discussed herein with respect to FIGS. 6 and 7 are directed to cross-domain communications with a shared worker involving only two domains, the concepts discussed herein are also applicable to any number of web applications and shared workers operating on different domains. By providing secure cross-domain communication with a shared worker 14, a plurality of web applications that previously would have needed to individually access, via one or more network servers, information, may now access that information locally, if a shared worker associated with that domain has already accessed the information and stored it in a local memory of the user's computing device. For example, according to the example of FIG. 7, if a third web application operating on a third domain (e.g., www.maps.google.com) desires access to a user's contacts (e.g., to provide a user with an HTML page including a map showing home addresses of a user's contacts), the third web application may also be configured to establish a communications link with a shared worker associated with the www.google.com domain, and access that information without accessing or more network locations. Thus, the more web applications sharing information via one or more shared workers, the more information acquisition inefficiencies that can be reduced or eliminated.

Figure 8:
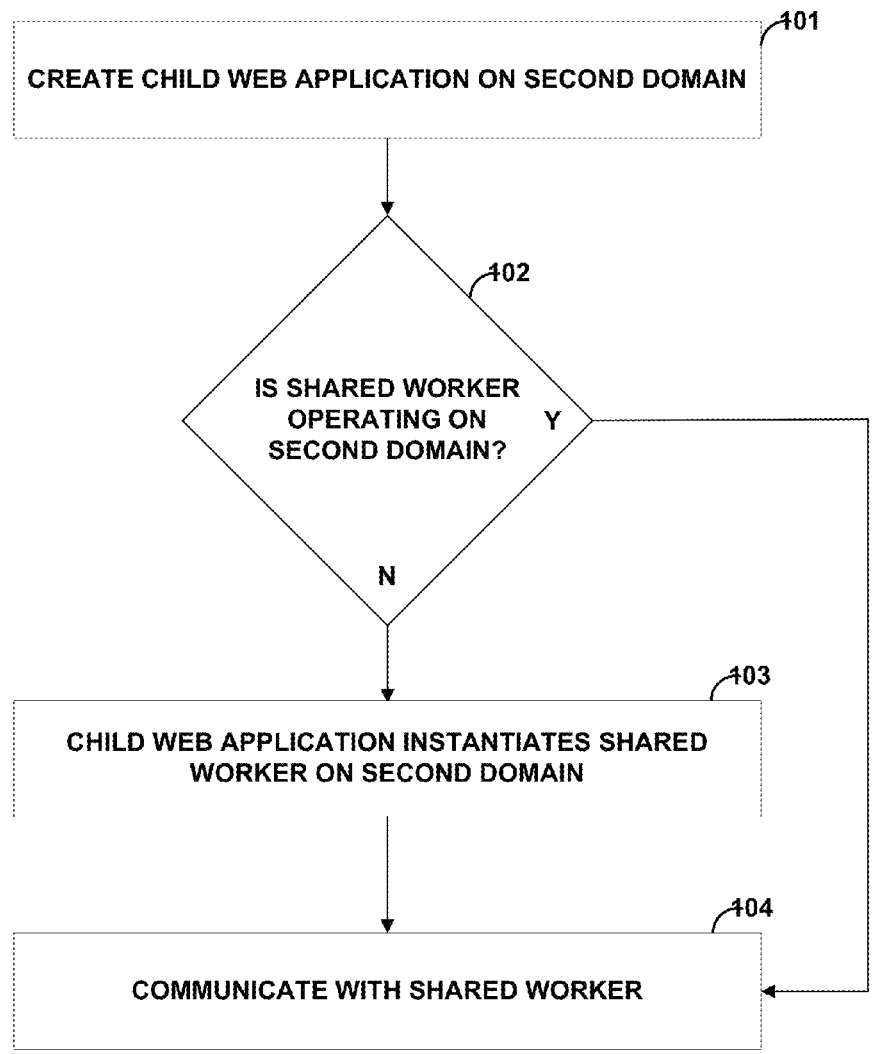
FIG. 8 is a flow chart diagram illustrating one example of a method for inter-domain communications with a shared worker application consistent with this disclosure.

FIG. 8 is a flow chart diagram depicting one example of a method of communicating between a web application associated with a first domain with a shared worker application (e.g., shared worker application 14) associated a second, different domain consistent with this disclosure. The method includes creating a child web application by a parent web application operating in a browser and associated with a first domain, and associating the child web application with a second, different domain (101). The method further includes determining whether a shared worker application associated with the second domain is operating in the browser (102). The shared worker acquires information associated with the second domain in response to one or more requests, and stores acquired information associated with the second domain in a volatile memory of the local computing device.

If the shared worker application associated with the second domain is not operating in the browser, the child web application may instantiate the shared worker application associated with the second domain (103). Once the shared worker application is instantiated (or determined to be operating at 802), the parent web application communicates with the shared worker application via the child web application (104). Communication between the parent web application and the shared worker may include the parent web application requesting information associated with the second domain from the shared worker. The shared worker may provide information to satisfy the request. If information is stored in a memory of the local computing device, the shared worker may provide the information from the memory. If the information is not stored in the memory of the local computing device, the shared worker may access the information from one or more network servers associated with the second domain, and provide acquired information to satisfy the request.

Figure 9:
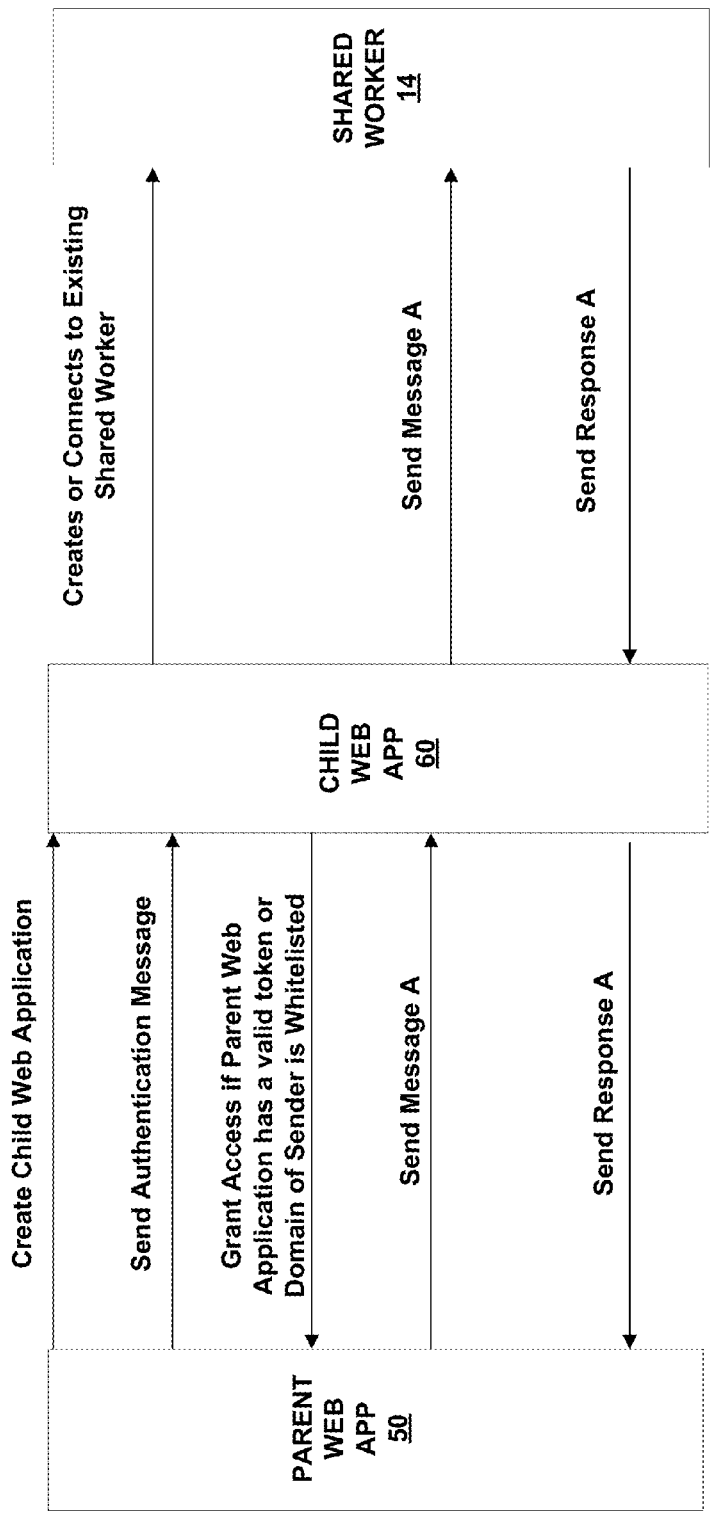
FIG. 9 is a conceptual diagram illustrating one example of inter-domain communications with a shared worker consistent with this disclosure.

FIG. 9 depicts one example of a technique for providing inter-shared worker cross-domain communication consistent with this disclosure. The techniques described thus far are directed generally to a web application associated with a first domain communicating, via another web application, with a shared worker application associated with a second, different domain to access information associated with the second domain via the shared worker. However, it may further be beneficial for shared workers associated with different domains to directly communicate cross-domain.

Figure 10:
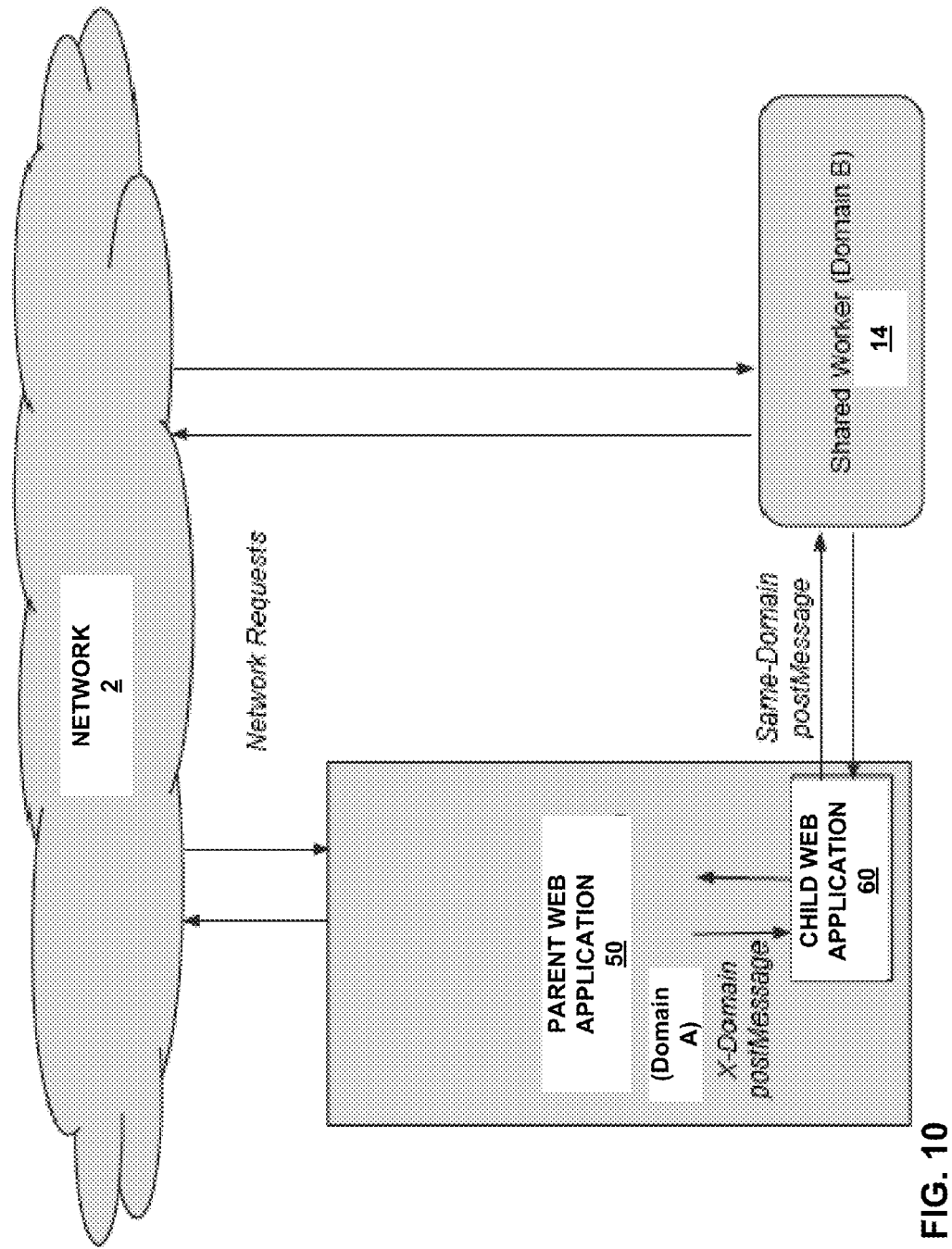
FIG. 10 is a conceptual diagram illustrating one example of inter-domain communications with a shared worker consistent with this disclosure.

FIG. 10 is a block/flow diagram illustrating one example of a technique for cross-domain communication with a shared worker 14 consistent with this disclosure. As depicted in FIG. 9, a parent web application 50 is associated with a first domain. The parent web application 50 creates a child web application 60 associated with a second domain different than the first domain. Child web application 60 may verify a shared worker 14 on the second domain. For example, child web application 60 may determine whether a shared worker 14 associated with the second domain is operating. If a shared worker 14 associated with the second domain is operating, child web application 60 may open a communications link with shared worker 14. If a shared worker 14 is not operating associated with the second domain, child web application may instantiate or generate shared worker 14 associated with the second domain.

Child web application 60 may communicate with parent web application 50 to verify parent web application 50 for cross-domain communications. Parent web application may send, to child web application 60, an authentication message. Child web application 60 may grant cross-domain communication access to parent web application 50 if parent web application 50 is authenticated. In one example, parent web application 50 may be authenticated according to a whitelist comparison as described above. In another example, parent web application 50 may be authenticated according to exchange of secure tokens as described above.

Once parent web application has been authenticated, parent web application 50 may be allowed to send messages to child web application. For example, parent web application 50 may send a Message A to child web application requesting information associated with the second domain. Child web application 60 may receive Message A, and forward Message A to shared worker 14. Shared worker may reply with a Response A, which may be information acquired in response to the request of Message A, e.g., network-accessible information associated with the second domain. Child web application 60 may receive Response A, and forward response A to parent web application 50. Parent web application 50 may then utilize received information of Response A.

Figure 11:
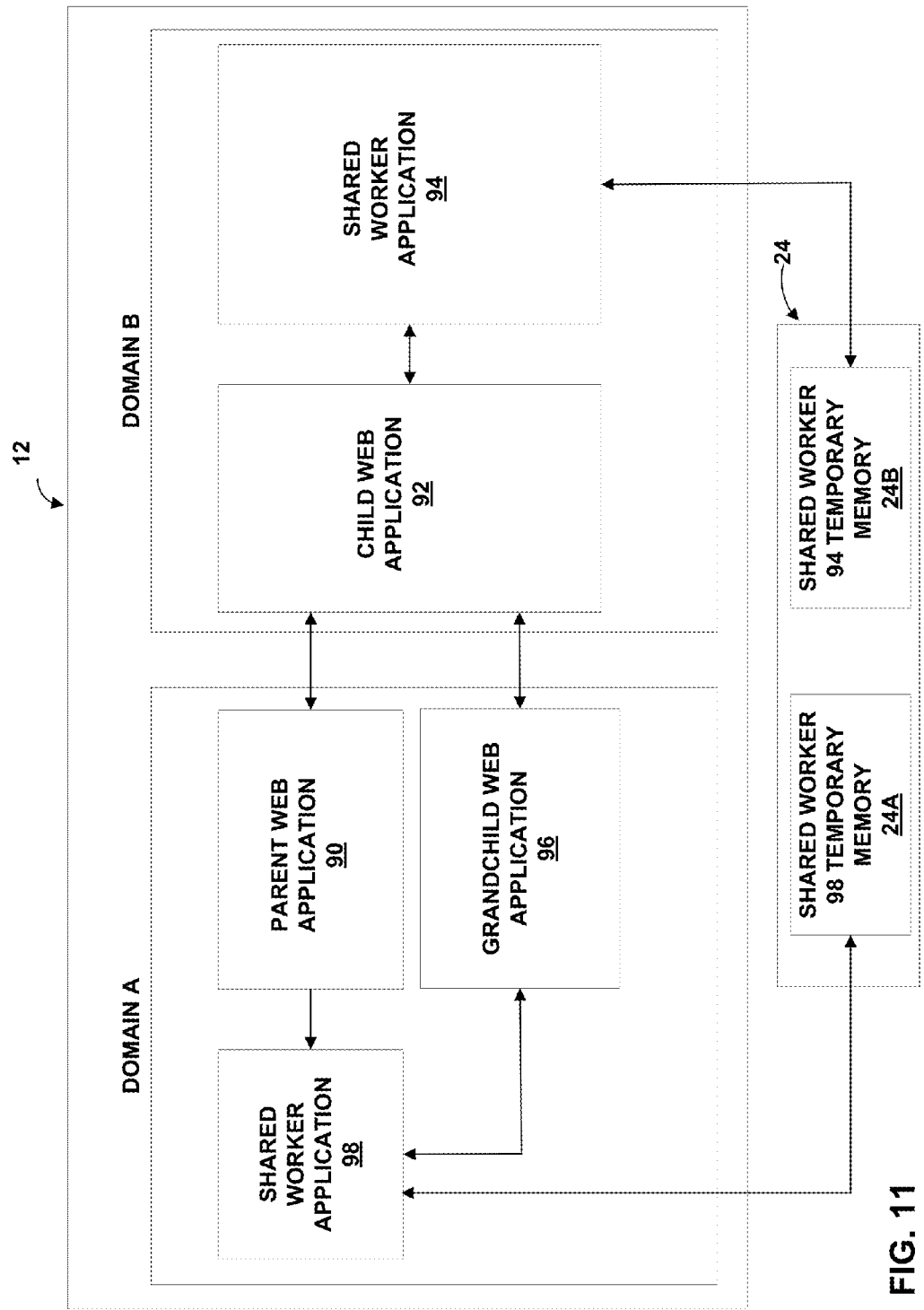
FIG. 11 is a block diagram illustrating one example of shared worker communication consistent with this disclosure.

FIG. 10 is a conceptual diagram illustrating cross-domain communications between a parent web application 50 associated with a first domain and a shared worker 14 associated with a second domain. As depicted parent web application 50 may be configured to access, via network 2, network-accessible information associated with domain A by sending one or more network requests to one or more servers associated with domain A. Parent web application 50 may also access information associated with domain B via a shared worker 14 associated with domain B via a child web application 60 also associated with domain B. Parent web application 50 may communicate with child web application 60 via one or more cross-domain postMessages. Child web application 60 may communicate with shared worker 14 via one or more Same-Domain postMessages, FIG. 11 depicts one example of a technique for enabling direct communications between shared worker applications associated with different domains. In the depicted example, a shared worker application 94 is operating in a browser 12 associated with domain B. In the example depicted in FIG. 11, a parent web application 90 associated with a different domain, domain A, has established a communication link with shared worker 94 via a child web application as described above with respect to FIGS. 6-10. Accordingly, parent web application 90 is configured to communicate requests for information associated with domain B to shared worker 94 via child web application 92, and receive information from shared worker 94 in response to the requests.

In the example depicted in FIG. 11, child web application 92 may desire to establish a direct communication link to a shared worker running in browser 12 and associated with domain A. In one example, child web application 92 may be configured to enable a communication link directly to shared worker application 98 via a communication link already established between parent web application 90 and child web application 92. However, in another example, child web application 96 may be configured to generate one or more grandchild web applications 96. Like child web application 92, grandchild web application 96 may be generated and associated with domain A. Grandchild web application 96 may be configured to verify whether or not a shared worker 98 is currently running in browser 12 associated with domain A. If shared worker 98 is not currently running, grandchild web application 96 may be configured to generate/instantiate shared worker application 98.

In one example, grandchild web application 96 may be configured to authenticate a secure communications link between child web application 92, grandchild web application 96, and shared worker application 98. Grandchild web application 96 may be configured to establish the secure communications link via exchange of secure authentication tokens or by whitelist comparison as described above with respect to child web application 60 in FIG. 6. In other examples, grandchild web application 96 may be configured to inherit authentication for secure inter-domain communications between domain A and domain B previously established between parent web application 90 and child web application 92.

As also shown in FIG. 11, each of shared workers 94, 98 may be configured to store acquired data in a local memory of a computing device upon which browser 12 is operating. In one such example, as depicted in FIG. 9, each shared worker 94, 98 operating on a computing device may allocate at least a portion of local memory 24 for storage of acquired information. In the example of FIG. 11, shared worker 94 has allocated a portion 24A of local memory 24 for storage, and shared worker 98 has allocated a portion 24B of local memory 24 for storage.

FIG. 11 and the corresponding description above describe the generation of a grandchild web application 96 in order to establish a communications link between shared workers 94 and 98. Depending on browser 12 requirements, examples in which child web application 92 is configured to establish a communications link directly between child web application 92 and shared worker application 98 are also contemplated and consistent with this disclosure.

The example techniques described with respect to FIG. 11 may be advantageous for a number of reasons. For example, by enabling direct cross-domain communication between shared workers 94 and 98 themselves (as opposed to cross-domain communication between a shared worker application and a non-shared worker web application e.g., parent web application 90), more information can be potentially acquired, stored locally, and provided in response to cross-domain requests between the shared workers.

In one example, each time a shared worker is instantiated associated with a particular domain, the shared worker may cause a child web application to be generated and associated with each domain for which web applications are currently operating in the browser. According to such a configuration, each time any shared worker operating in browser acquires information in response to a request, that information may be provided to other shared workers associated with different domains. Thus, should any shared worker receive a request for information that has already been accessed by any shared worker associated with any domain, the shared worker that received the request would already have the information available and stored in local memory. Thus, these techniques may improve browser speed, because the more network accessible data acquisition redundancy eliminated, the more efficient a browser may be able to operate.

Also, since more information is available to all of the shared workers, should a user experience a network outage or slowdown, at least some information would be available to allow the user to continue working. As an example, according to the example illustrated in FIG. 7, a user attempting to draft an email to John Smith would still be able to access the information acquired by www.google.com/contacts in order to provide an address to the email, because the information previously acquired from www.google.com/contacts is stored in a local memory of the user's computing device. Thus, the user may create the email, save the email, and send the email at a later time when the user has access to a functioning network connection.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various embodiments of the disclosure have been described. These and other embodiments are within the scope of the following claims.

The invention claimed is:

1. A method, comprising:
   executing, by a computing device, a first and a second web application within a web browser, the first web application being associated with a first domain, the second web application being associated with a second domain that is different from the first domain;
   caching, by a shared worker application associated with the first domain and executing on the computing device, information received from the first domain; and
   in response to a request from the second web application for the cached information and in response to determining that web applications associated with the second domain are allowed to securely communicate with web applications associated with the first domain, providing, by the shared worker application, the cached information to the second web application,
   wherein determining that web applications associated with the second domain are allowed to securely communicate with web applications associated with the first domain comprises:
   communicating, by the computing device, an identification of the second web application to a network server associated with the first domain; and
   receiving, by the computing device, an indication of authentication if the second domain is included in a list of authorized domains or the second web application is included a list of authorized web applications.

2. The method of claim 1, wherein the first and second domains comprise web resources having different domain names.

3. The method of claim 1, further comprising:
   in response to determining, by the shared worker application, that the cached information satisfies the request, providing, by the shared worker application, the cached information to satisfy the request.

4. The method of claim 1, wherein the shared worker application is operable to remain executing after terminating the first web application.

5. The method of claim 4, further comprising terminating the web browser after caching the information but prior to providing the cached information to satisfy the request.

6. The method of claim 1,
   wherein the information is requested in a first window or tab of the web browser; and
   wherein the request is made in a second window or tab of the web browser.

7. The method of claim 1, wherein the web browser is a first web browser; and
   wherein the request is made in a second web browser executing on the computing device.

8. A computerized system, comprising one or more processors configured to:
   execute a first and a second web application within a web browser, the first web application being associated with a first domain, the second web application being associated with a second domain that is different from the first domain;

execute a shared worker application that is associated with the first domain and that is operable to:
  cache information received from the first domain, and
  provide, in response to a request from the second web application for the cached information and in response to determining that web applications associated with the second domain are allowed to securely communicate with web applications associated with the first domain, the cached information to the second web application,
  wherein to determine that web applications associated with the second domain are allowed to securely communicate with web applications associated with the first domain, the one or more processors are configured to:
    communicate an identification of the second web application to a network server associated with the first domain; and
    receive an indication of authentication if the second domain is included in a list of authorized domains or the second web application is included in a list of authorized web applications.

9. The computerized system of claim 8, wherein the computerized system comprises a mobile wireless device.

10. The computerized system of claim 8, wherein the first and second domains comprise web resources having different domain names.

11. The computerized system of claim 8, wherein the shared worker application is further operable to:
  determine that the cached information satisfies the request, and
  provide the cached information to satisfy the request based on the determination that the cached information satisfies the request.

12. The computerized system of claim 8, wherein the shared worker application is further operable to remain executing upon terminating the first and second web applications.

13. The computerized system of claim 12, wherein the shared worker application is further operable to provide the cached information after the first web application is terminated.

14. The computerized system of claim 8, wherein the information is requested in a first window or tab of the web browser; and
  wherein the request is made in a second window or tab of the web browser.

15. The computerized system of claim 8,
  wherein the web browser is a first web browser; and
  wherein the request is made in a second web browser executing on the computerized system.

16. A non-transitory machine-readable medium with instructions stored thereon, the instructions, when executed, cause a computerized system to:
  execute a first and a second web application within a web browser, the first web application being associated with a first domain, the second web application being associated with a second domain that is different from the first domain;
  execute a shared worker application configured to:
    cache information received from the first domain, and
    in response to a request from the second web application for the cached information and in response to determining that web applications associated with the second domain are allowed to securely communicate with web applications associated with the first domain, provide the cached information to the second web application,
  wherein to determine that web applications associated with the second domain are allowed to securely communicate with web applications associated with the first domain, the instructions cause the computerized system to:
    communicate an identification of the second web application to a network server associated with the first domain; and
    receive an indication of authentication if the second domain is included in a list of authorized domains or the second web application is included in a list of authorized web applications.

17. The machine-readable medium of claim 16, wherein the first and second domains comprise web resources having different domain names.

18. The machine-readable medium of claim 16, wherein the instructions, when executed, further cause the computerized system to:
  provide the cached information to satisfy the request only if the cached information satisfies the request.

19. The machine-readable medium of claim 16, wherein the shared worker application remains executing upon terminating the first and second web applications.

20. The machine-readable medium of claim 16, wherein the information is requested in a first window or tab of the web browser; and
  wherein the request is made in a second window or tab of the web browser.

21. The machine-readable medium of claim 16,
  wherein the information is requested in a first browser application; and
  wherein the request is made in a second web browser executing on the computerized system.

22. The machine-readable medium of claim 16, wherein the shared worker application is configured to share information spanning multiple instantiations of a single web application.

23. The method of claim 1, wherein the shared worker application is configured to share information spanning multiple instantiations of a single web application.

24. The computerized system of claim 8, wherein the shared worker application is configured to share information spanning multiple instantiations of a single web application.

25. The method of claim 1, further comprising:
  requesting, by the second web application and from a network server associated with the second domain, a security token for communicating with the first domain;
  receiving the security token;
  communicating, by the second web application, the security token to the network server associated with the first domain; and
  receiving, by the computing device and from the network server associated with the first domain, an indication that cross-domain communication is authorized.

* * * * *